Patented Aug. 26, 1930

1,773,967

UNITED STATES PATENT OFFICE

CAMILLE DREYFUS, OF NEW YORK, N. Y.

PROCESS OF CUTTING FABRIC AND PRODUCT THEREOF

No Drawing.   Application filed October 5, 1927.   Serial No. 224,287.

This invention relates to the method of cutting fabric made of thermoplastic or organic derivatives of cellulose in such a manner that the cut edges will not fray or ravel. An object of my invention is to cut fabrics in such a manner that the cut fabric will not fray or ravel along its edges. A further object of my invention is to provide a method of cutting fabrics so that it is not necessary to hem or otherwise fold or sew the cut edges in order to prevent fraying. Other objects of my invention will appear from the following detailed description.

Heretofore whenever a woven or knitted fabric was cut in the ordinary manner such as by means of a knife or shears, it has been necessary to hem or sew the cut edge before the fabric could be used in order to avoid fraying or ravelling along the cut edge. The ravelling or fraying of cut fabrics has always previously been considered a necessary evil.

In accordance with my invention, I provide a method of cutting fabric whereby the cut fabric may be used directly without any further operations to avoid fraying.

The fabric to be used in practicing my invention is made in whole or in part of a material that can be fused by the action of heat, or can be dissolved by a solvent, or can be softened by a softening agent. Among the materials that may be used are thermoplastic compounds of cellulose or other derivatives of cellulose, particularly the organic derivatives of cellulose, such as organic esters of cellulose and cellulose ethers. Examples of organic esters of cellulose are cellulose formate, cellulose acetate, cellulose propionate and cellulose butyrate. Examples of ethers of cellulose are methyl cellulose, ethyl cellulose and benzyl cellulose. The fabric may be composed entirely of one of the above compounds or of a mixture of two or more of such compounds. Moreover, the fabric need not be made entirely of the above cellulose compounds, but may be a mixed fabric containing yarns of the above cellulose compounds and yarns of vegetable or animal fibres. Examples of such mixed fabrics are, mixed cellulose acetate and natural silk, mixed cellulose acetate and cotton, mixed cellulose acetate and wool, etc. The fabric to be used in practicing my invention may be of any desired construction. It may be a woven fabric of any desired weave, or it may be a circular or warp knitted fabric.

In carrying out my invention, a fabric constituted as above set forth, is cut into the desired configuration by means of knives or other cutting means which may be either hot or cold and the cut edges are sealed against fraying by fusion or by the action of the solvent or of a softening agent. In one form of my invention, the cutting is done by a hot spatula, knife or knives or other device which melts the fusible material sufficiently to seal the cut edges against fraying upon solidifying when permitted to cool. The temperature of the cutting device should preferably be sufficiently high to melt the freshly made edge but not so high as to melt any of the material appreciably distant from the edge, since if too much material is melted, the edge so made will be of irregular thickness due to the formation of globules or molten material. One form of device suitable for this comprises a blade heated electrically, such as can be made by replacing the soldering point of an ordinary electrical soldering iron with a short blade or spatula. However, any other suitable devices may be used.

Or else the sealing may be further completed when the cutting is done by a hot knife, or it may be done entirely when the cutting is done with a cold knife or mechanism, by fusing the cut edges by passing the same along a hot surface maintained at the temperature above indicated, or even by the use of a flame. Obviously any other method of fusing the cut edge of the strip or ribbon may be used.

In another form of my invention, the cut edges of the fabric are sealed against fraying or ravelling by applying a solvent to the edges in any suitable manner. The solvent should preferably be applied in such a manner that the solvent is permitted to remain only at the edge of the material being treated or is permitted to penetrate to a point only slightly removed from the edge in order to prevent the destruction of the fabric. Among the solvents that may be used are acetone, diacetone alcohol, chloroform, cyclohexanone, etc. Although these solvents are mentioned specifically, it is to be understood that any appropriate solvent may be used. The solvent dissolves a part of the soluble material along the edge, and upon evaporation causes coalesence between the cut yarns and leaves a film of the material which acts as a sealing means for, or bond between, the cut edges of the yarn. Instead of using agents which are so drastic in their action as to be classed as solvents, softening agents may be used for the purpose of sealing the cut edge.

The fabric used in my process may be of any desired weave or it may even be a knit fabric. The application of this process to circular knit fabrics composed of the material as set forth above presents great advantages, since ordinary methods of cutting this material cannot be used because of its pronounced tendency to ladder or "run". However, when the cutting is done by a knife blade or spatula heated to the proper temperature as above set forth, the melting of the material along the edge will serve to coalesce the adjacent threads or filaments to effectively prevent any laddering at the edge. This is especially valuable, since it makes possible the use of circular knit fabric in a manner heretofore impossible.

This method of cutting fabric is of general application and may be used to cut fabrics into any desired shape or form. Among the many uses may be suggested the making of bias tape by cutting fabric on the bias into strips. Such tape need not be folded as is necessary with ordinary bias tape.

This invention is useful in making garments, since the sealed edges act as selvedges and therefore it is not necessary to make any hem. In the making of garments with fabric cut in accordance with my invention, the only sewing necessary is the making of a mere simple seam where pieces of fabric are to be joined. Moreover, where flat articles of any shape whatsoever are to be made, such as table covers, doilies, strips, etc. no sewing whatever is necessary by the use of my invention since when such articles are cut by my process, no hemming is necessary to avoid fraying or ravelling. Likewise, in the making of shoulder straps for feminine wearing apparel the straps may be made with varying width without any bulky hems. By the use of my invention, not only is the time and labor of sewing avoided, but articles of greater beauty and less bulkiness may be made.

While I have described my invention in detail, it is to be understood that many variations may be made therein without departing from the spirit of this invention.

Having described my invention, what I claim and desire to secure by Letters Patent is:

1. Process of preparing a cut fabric composed at least in part of a liquefiable material comprising cutting such fabric and sealing the cut edge against fraying or ravelling by at least partially liquefying the edge and then permitting the same to solidify.

2. Process of preparing a cut fabric composed at least in part of a thermoplastic derivative of cellulose comprising cutting such fabric and sealing the cut edge against fraying or ravelling by at least partially liquefying the edge and then permitting the same to solidify.

3. Process of preparing a cut fabric composed at least in part of an organic derivative of cellulose comprising cutting such fabric and sealing the cut edge against fraying or ravelling by at least partially liquefying the edge and then permitting the same to solidify.

4. Process of preparing a cut fabric composed at least in part of cellulose acetate comprising cutting such fabric and sealing the cut edge against fraying or ravelling by at least partially liquefying the edge and then permitting the same to solidify.

5. Process of preparing a cut fabric composed at least in part of a thermoplastic derivative of cellulose comprising cutting such fabric and sealing the cut edge against fraying or ravelling by at least partially fusing the edge and then permitting the same to solidify.

6. Process of preparing a cut fabric composed at least in part of an organic derivative of cellulose comprising cutting such fabric and sealing the cut edge against fraying or ravelling by at least partially fusing the edge and then permitting the same to solidify.

7. Process of preparing a cut fabric composed at least in part of cellulose acetate comprising cutting such fabric and sealing the cut edge against fraying or ravelling by at least partially fusing the edge and then permitting the same to solidify.

8. Process of cutting fabric composed at least in part of thermoplastic derivatives of cellulose comprising passing the edge of a heated blade over the same.

9. Process of cutting fabric composed at least in part of cellulose acetate comprising passing the edge of a heated blade over the same.

10. Process of cutting a piece of fabric composed at least in part of thermoplastic derivatives of cellulose comprising passing a heated means over the surface thereof in a direction irrespective of the weave or knit, whereby the cut edge is sealed against fraying or ravelling.

11. Process of cutting a piece of fabric composed at least in part of cellulose acetate comprising passing a heated means over the surface thereof in a direction irrespective of the weave or knit, whereby the cut edge is sealed against fraying or ravelling.

12. A piece of fabric containing thermoplastic derivatives of cellulose having a cut edge that does not ravel or fray, said edge being unhemmed and free from a woven selvedge, which edge has been at least partially liquefied and then permitted to solidify.

13. A piece of fabric having a cut edge across its lines of weave or knit, which edge does not ravel or fray, which edge has been at least partially liquefied and then permitted to solidify.

14. A piece of fabric composed at least in part of a thermoplastic derivative of cellulose having an edge which has been at least partially liquefied and then permitted to solidify.

15. A piece of fabric composed at least in part of cellulose acetate having an edge which has been at least partially liquefied and then permitted to solidify.

16. A piece of fabric composed at least in part of thermoplastic derivatives of cellulose having an edge which has been sealed against fraying by fusion.

17. A piece of fabric composed at least in part of cellulose acetate having an edge which has been sealed against fraying by fusion.

18. A garment having pieces of fabric containing thermoplastic derivatives of cellulose joined together by a simple seam, said pieces of fabric having a cut edge that does not ravel or fray, said edge being unhemmed, and free from a woven selvedge, which edge has been at least partially liquefied and then permitted to solidify.

19. A garment having pieces of fabric joined together by a simple seam, said piece of fabric being composed at least in part of a thermoplastic derivative of cellulose and having an edge in the seam which has been sealed against fraying by fusion.

In testimony whereof, I have hereunto subscribed my name.

CAMILLE DREYFUS.